United States Patent
Yoshikawa et al.

(10) Patent No.: US 7,134,954 B2
(45) Date of Patent: Nov. 14, 2006

(54) METHOD FOR PRODUCING MODIFIED NATURAL INTESTINES

(75) Inventors: Ryuichi Yoshikawa, Soka (JP); Yusuke Nakanishi, Soka (JP); Yuki Iwata, Soka (JP)

(73) Assignee: Riken Vitamin Co., Ltd., Tokyo (JP)

( * ) Notice: Subject to any disclaimer, the term of this patent is extended or adjusted under 35 U.S.C. 154(b) by 0 days.

(21) Appl. No.: 11/280,306

(22) Filed: Nov. 17, 2005

(65) Prior Publication Data

US 2006/0128293 A1     Jun. 15, 2006

(30) Foreign Application Priority Data

Dec. 13, 2004    (JP) .............................. 2004-360239

(51) Int. Cl.
*A22C 13/00*    (2006.01)

(52) U.S. Cl. ........................................................ 452/32

(58) Field of Classification Search .................... None
See application file for complete search history.

(56) References Cited

U.S. PATENT DOCUMENTS

| | | | |
|---|---|---|---|
| 3,959,502 A | 5/1976 | Vaessen | |
| 4,015,784 A * | 4/1977 | Hughes | 241/162 |
| 4,062,980 A * | 12/1977 | Wilson et al. | 426/278 |
| 4,363,819 A * | 12/1982 | Steffen | 426/132 |
| 4,406,831 A * | 9/1983 | Atteck | 530/422 |
| 4,662,403 A * | 5/1987 | Hammer et al. | 138/118.1 |
| 4,818,551 A * | 4/1989 | Stall et al. | 426/420 |
| 4,997,663 A * | 3/1991 | Potthast | 426/241 |
| 5,480,691 A * | 1/1996 | Hammer et al. | 428/34.8 |
| 5,690,977 A * | 11/1997 | Hammer et al. | 426/105 |
| 5,928,738 A * | 7/1999 | Auf Der Heide et al. | 428/34.8 |
| 6,514,551 B1 * | 2/2003 | Schur | 426/335 |
| 6,582,746 B1 * | 6/2003 | Altemueller et al. | 426/574 |
| 6,660,315 B1 * | 12/2003 | Miller et al. | 426/105 |
| 6,808,771 B1 * | 10/2004 | Auf Der Heide et al. | 428/34.8 |
| 6,942,885 B1 * | 9/2005 | Ross et al. | 426/94 |
| 6,991,836 B1 * | 1/2006 | Gopal | 428/34.8 |
| 7,008,661 B1 * | 3/2006 | Koike et al. | 426/601 |

FOREIGN PATENT DOCUMENTS

| | | |
|---|---|---|
| CH | 446 870 | 11/1967 |
| DE | 34 30 079 | 3/1985 |
| DE | 39 12 435 | 10/1990 |
| JP | 1-199537 | 8/1989 |
| JP | 8-242817 | 9/1996 |
| JP | 9-117252 | 5/1997 |

* cited by examiner

*Primary Examiner*—Thomas Price
(74) *Attorney, Agent, or Firm*—Wenderoth, Lind & Ponack, L.L.P.

(57) ABSTRACT

The present invention is to provide a method for producing an animal natural intestine having improved texture and hardness by treatment with a solution containing a food emulsifier.

9 Claims, No Drawings

METHOD FOR PRODUCING MODIFIED NATURAL INTESTINES

TECHNICAL FIELD

The present invention relates to a method for producing a natural intestine of animals such as sheep, pig, cow and the like, which can be used as a casing for sausages, etc., and has an improved texture and hardness.

BACKGROUND ART

Natural intestines of animals such as sheep, pig, cow and the like have been conventionally used as a casing for sausages, etc. However, these natural intestine casings have drawbacks in that they are generally not crisp and are too hard to be chewed completely, and as a result debris of such casing which is a piece of intestine is left in the mouth.

As a method for improving such drawbacks of the natural intestines, a method for tenderizing an edible casing for sausages treated with soy sauce (see, JP-A-1989-199537), a modified natural animal intestine modified by immersing in an aqueous solution of transglutaminase (see, JP-A-1997-117252), and a method for producing a sausage having a crisp and tender natural intestine casing, which comprises packing meat paste for sausage into a natural intestine casing, treating the packed meat paste with warm water adjusted to acidity of pH 2 to 5 or alkalinity of pH 8 to 10, and then heat-treating by the conventional method (see, JP-A-1996-242817).

At the present time, however, it is still difficult to say that the above drawbacks have been completely solved even if those methods as mentioned above are adopted. Therefore, there is a desire for a method for producing natural intestines used for sausage casing improved in the texture and hardness.

DISCLOSURE OF THE INVENTION

Technical Problems to be Solved

An object of the present invention is to provide a method for producing a natural animal intestine having improved texture and hardness, which is used as a casing for sausages, etc.

Means to Solve the Problem

The present inventors have extensively studied the above technical problems, and as a result, have found that such problems can be solved by treating a natural intestine with a solution containing a food emulsifier. The present invention has been completed based on these findings.

That is, the present invention comprises:

(1) a method for producing a modified natural intestine, which comprises treating a natural intestine with a solution containing a food emulsifier, (2) the method according to the above (1), wherein the food emulsifier is organic acid and fatty acid esters of glycerol, a polyglycerol fatty acid ester or an enzymatically decomposed lecithin, and (3) a sausage produced by using, as a casing, the modified natural intestine obtained according to the method described in the above (1) or (2).

EFFECT OF THE PRESENT INVENTION

In accordance with the present invention, natural animal intestines of sheep, pig, cow, etc. can be easily modified, i.e. the texture of sausages, etc. can be improved when the modified intestine is used as a casing.

BEST MODE FOR CARRYING OUT THE INVENTION

The present invention relates to a method for producing a modified natural intestine through treatment with a solution containing a food emulsifier. Hereinafter, the present invention will be illustrated in more detail.

The natural intestines of the present invention include, for example, small intestine, large intestine, rectum, cecum and stomach of sheep, pig, cow, horse, chicken, rabbit, etc. among which small intestine or rectum of sheep, pig or cow is preferable. These animal natural intestines are distributing in the market generally as dried products or salted products, and any one of those products can be preferably used.

In the present invention, the above animal natural intestine which is distributing in the market generally as dried or salted products is first subjected to restoration treatment such as tenderizing and/or desalting procedure. That is, in the case where the natural intestine is a dried product, it is tenderized, for example, by immersing in warm water. On the other hand, in the case of a salted product, it is desalted, for example, by immersing in running water. Then, the restored natural intestine is treated with a solution containing a food emulsifier. It is also possible to simultaneously carry out the above restoration treatment and the above treatment with a food emulsifier on the above natural intestine which is distributing in the market as a dried or salted product.

Examples of the food emulsifiers in the production of natural intestines of the present invention are glycerol fatty acid esters, sucrose fatty acid esters, sorbitan fatty acid esters, propylene glycol fatty acid esters and lecithin. The glycerol fatty acid esters include glycerol organic acid fatty acid esters, polyglycerol fatty acid esters, and polyglycerol condensed ricinoleic acid esters, in addition to esters of glycerol with fatty acid. The glycerol organic acid fatty acid esters include, for example, glycerol acetate esters, acetic and fatty acid esters of glycerol, lactic and fatty acid esters of glycerol, citric and fatty acid esters of glycerol, and succinic and fatty acid esters of glycerol, and diacetyltartaric and fatty acid esters of glycerol. The lecithins include, for example, fractionated lecithin, enzymatically decomposed lecithin and enzyme-treated lecithin. These food emulsifiers may be used alone or as a mixture of two or more of them.

Although there is no particular limitation on the fatty acids constituting the above glycerol fatty acid esters (e.g. esters of glycerol with fatty acids, glycerol organic acid and fatty acid esters, and polyglycerol fatty acid esters), sucrose fatty acid esters, sorbitan fatty acid esters, and propylene glycol fatty acid esters, so long as they are a fatty acid derived from edible animal or vegetable oils and fats, examples of such fatty acids include saturated or unsaturated fatty acids with 6 to 24 carbon atoms, preferably unsaturated fatty acids or a mixture thereof containing an unsaturated fatty acid with 18 carbon atoms such as oleic acid in an amount of not less than 50% by mass, more preferably in an amount of not less than 70% by mass.

It is preferable to use organic acid and fatty acid esters of glycerol, polyglycerol fatty acid esters, enzymatically decomposed lecithin, and the like as a food emulsifier of the present invention.

There is no particular limitation on a solution containing a food emulsifier in the production of natural intestines of the present invention so long as it is a homogeneous liquid phase comprising a food emulsifier as a solute. For example, such solution includes a mechanically dispersed solution wherein the particles of the food emulsifier are larger than colloidal particles; a colloidal solution wherein the particles of the food emulsifier is colloidal particles; and a true solution wherein the particles of the food emulsifiers are of molecular size. As used herein, there is no limitation on the solvents for forming a liquid phase so long as they are edible, and examples of such solvents are water, ethanol, oils and fats, and the like.

Further, the solution containing the emulsifier for the production of natural intestines of the present invention may include a solution containing a food emulsifier, water, and oils and fats, and examples of such solution are oil-in-water emulsion, water-in-oil emulsion, and solubilized liquid.

As for the water mentioned above, there is no particular limitation so long as it is drinkable. For example, such water includes purified water such as water distilled water, treated with ion-exchange resin, water treated with reverse osmosis membrane (RO), and water treated with ultrafiltration membrane (UF); tap water; natural water such as ground water and spring water; and alkali ion water.

Although there is no particular limitation on the above oils and fats, they include, for example, vegetable oils and fats such as soybean oil, rapeseed oil, cottonseed oil, safflower oil, sunflower oil, rice bran oil, corn oil, coconut oil, palmoil, palm kernel oil, peanut oil, olive oil, higholeic rapeseed oil, high oleic safflower oil, high oleic corn oil and high oleic sunflower oil; animal oils and fats such as tallow, lard, fish oil and milk fat; those obtained through isolation, hydrogenation or transesterification of the animal and vegetable oils and fats; and medium chain fatty acid triglycerides (MCT). Among them, vegetable oils and fats which are liquid at normal temperature (about 15° C. to 25° C.), such as soybean oil, rapeseed oil and corn oil, are preferred.

There is no particular limitation on the method for producing a solution containing a food emulsifier in the production of natural intestines of the present invention, and such solution can be prepared by the methods known per se. It is preferable to control the content of the food emulsifier in about 0.1 to 20% by mass, preferably about 0.5 to 10% by mass, relative to 100% by mass of the solution containing the food emulsifier.

The pH of the solution containing a food emulsifier in the production of natural intestines of the present invention (hereinafter, simply referred to as a solution in some cases) may be acidic (e.g. not higher than about pH 6.5), or neutral or alkaline (e.g. not lower than about pH 7.5), preferably neutral or slightly alkaline (e.g. about pH 7.5 to 9) or weakly alkaline (a pH of higher than about 9 and not higher than about 11).

In order to adjust the solution to an acidic pH, an acid is added. Examples of such acids may be any acids so long as they are usable as food additives, and include, for example, adipic acid, citric acid, glucono-δ-lactone, gluconic acid, tartaric acid, lactic acid, acetic acid, fumaric acid, malic acid, succinic acid, and the like.

In order to adjust the solution to an alkaline pH, an alkali is added. Examples of such alkalis may be any alkalis, and include, for example, potassium hydroxide, sodium hydroxide, potassium carbonate, sodium carbonate, sodium hydrogen carbonate, tetrapotassium pyrophosphate, tetrasodium pyrophosphate, potassium polyphosphate, sodium polyphosphate, potassium metaphosphate, sodium metaphosphate, tripotassium phosphate, trisodium phosphate, dipotassium hydrogen phosphate, disodium hydrogen phosphate, and the like. Further, in place of such alkalis, the alkali ion water (for example, about pH 9 to 10) described above may be used.

As a method for treating a restored natural intestine obtained by the method described above with a solution containing a food emulsifier in the production of natural intestines of the present invention, there are exemplified a method of immersing a natural intestine in the solution, and a method of spraying the solution onto the natural intestine. Among these methods, preferred is the method of completely immersing a natural intestine in the solution. In the case of immersing the natural intestine in the solution, it is preferred to immerse the natural intestine in the solution until it sinks completely.

The temperature required for immersing a natural intestine in the solution is room temperature (about 1 to 30° C.), preferably 1° C. to normal temperature (about 15 to 25° C.), more preferably about 1 to 10° C.

In the case of a temperature of not lower than 30° C., there is a risk that decomposition due to bacterial proliferation takes place undesirably. The time required for immersing the natural intestine in the solution correlates to the immersing temperature, and although it is difficult to generally determine the immersing time, the immersing time is preferably, for example, about 0.5 to 5 hours at normal temperature (about 15 to 25° C.) or about 2 to 24 hours at about 1 to 10° C. However, there is no limitation on these immersing times, so long as they can permit to obtain immersing effects such as improvements in texture and hardness of natural intestines.

The thus modified natural intestines obtained in accordance with the present invention can be used as a casing for various kinds of sausages such as Wiener sausages, Bologna sausages, Frankfurt sausages, salami sausages, and the like.

With respect to a method for producing various sausages with use of the modified natural intestine of the present invention, there is no particular limitation, and the methods known per se can be employed.

Hereinafter, the present invention will be more specifically illustrated based on Examples, but it is to be understood that the present invention is not limited to these Examples.

EXAMPLE 1

A salted natural sheep casing (made in China, 19 mm/21 mm in diameter) was desalted well in running water, and about 500 g of the sheep casing from which the moisture had been removed was immersed in a solution comprising 5 g of fatty acid diglyceride (trade name: Poem DO-100V; available from Riken Vitamin Co., Ltd.) and 495 g of tap water, followed by emulsification at 4° C. for 8 hours with stirring gently.

EXAMPLE 2

A salted natural sheep casing (made in China, 19 mm/21 mm in diameter) was well desalted in running water, and about 500 g of the sheep casing from which the moisture had been removed was immersed in a solution comprising 5 g of diacetyltartaric and fatty acid esters of glycerol (trade name: Poem W-14; available from Riken Vitamin Co., Ltd.) and 495 g of tap water, followed by emulsification at 4° C. for 8 hours with stirring gently.

EXAMPLE 3

A salted natural sheep casing (made in China, 19 mm/21 mm in diameter) was well desalted in running water, and about 500 g of the sheep casing from which the moisture had been removed was immersed in a solution comprising 5 g of enzymatically decomposed lecithin (trade name: Friend Max K; available from The Solae Company, USA) and 495 g of tap water, followed by emulsification at 4° C. for 8 hours with stirring gently.

EXAMPLE 4

A salted natural pig casing (made in China, 30 mm/33 mm in diameter) was well desalted in running water, and about 500 g of the pig casing from which the moisture had been removed was immersed in a solution comprising 5 g of fatty acid diglyceride (trade name: Poem DO-100V; available from Riken Vitamin Co., Ltd.) and 495 g of tap water, followed by emulsification at 4° C. for 8 hours with stirring gently.

EXAMPLE 5

A salted natural pig casing (made in China, 30 mm/33 mm in diameter) was well desalted in running water, and about 500 g of the pig casing from which the moisture had been removed was immersed in a solution comprising 5 g of fatty acid diglyceride (trade name: Poem DO-100V; available from Riken Vitamin Co., Ltd.), 1 g of sodium hydrogen carbonate and 494 g of tap water, followed by emulsification at 4° C. for 8 hours with stirring gently.

EXAMPLE 6

A salted natural pig casing (made in China, 30 mm/33 mm in diameter) was well desalted in running water, and about 500 g of the pig casing from which the moisture had been removed was immersed in a solution prepared by previously heating and dissolving 5 g of fatty acid diglyceride (trade name: Poem DO-100V; available from Riken Vitamin Co., Ltd.) and 450 g of rapeseed oil and subsequently cooling the solution to 4° C., and treated with the emulsifier at 4° C. for 8 hours with stirring gently.

EXAMPLE 7

A salted natural pig casing (made in China, 30 mm/33 mm in diameter) was well desalted in running water, and about 500 g of the pig casing from which the moisture had been removed was immersed in a solution comprising 50 g of a solution prepared by previously heating and dissolving 5 g of fatty acid diglyceride (trade name: Poem DO-100V; available from Riken Vitamin Co., Ltd.) and 45 g of rapeseed oil, and 450 g of tap water, followed by emulsification at 4° C. for 8 hours with stirring gently.

EXAMPLE 8

A salted natural pig casing (made in China, 30 mm/33 mm in diameter) was well desalted in running water, and about 500 g of the pig casing from which the moisture had been removed was immersed in a solution comprising 50 g of a solution prepared by previously heating and dissolving 5 g of fatty acid diglyceride (trade name: Poem DO-100V; available from Riken Vitamin Co., Ltd.) and 45 g of rapeseed oil, 1 g of sodium hydrogen carbonate and 449 g of tap water, followed by emulsification at 4° C. for 8 hours with stirring gently.

TEST EXAMPLE 1

A salted natural sheep casing (made in China, 19 mm/21 mm in diameter) was well desalted in running water, and about 500 g of the sheep casing from which the moisture had been removed was immersed in 500 g of tap water at 4° C. for 8 hours.

TEST EXAMPLE 2

A salted natural pig casing (made in China, 30 mm/33 mm in diameter) was well desalted in running water, and about 500 g of the pig casing from which the moisture had been removed was immersed in 500 g of tap water at 4° C. for 8 hours.

TEST EXAMPLE 3

A salted natural pig casing (made in China, 30 mm/33 mm in diameter) was well desalted in running water, and about 500 g of the sheep casing from which the moisture had been removed was immersed in 500 g of rapeseed oil at 4° C. for 8 hours.

EXAMPLE 9

The emulsified natural casings (Examples 1 to 8) were taken out respectively from the emulsified solutions. After simple washing with water, these casings were tested to produce a sausage according to the conventional method based on the hereinafter described method. Similarly, the unemulsified natural casings (Test Examples 1 to 3) as the casing were tested to produce sausages according to the hereinafter described production procedure of sausages.

Production of Sausage

To a picnic shoulder minced meat (100 parts by mass) which had been stored in a refrigerator (inner temperature of 0° C.) were added sodium chloride (1.5 parts by mass), sugar (0.7 parts by mass), sodium polyphosphate (0.3 parts by mass), sodium glutamate (0.2 parts by mass), sodium nitrite (0.01 parts by mass), sodium ascorbate (0.05 parts by mass) and white pepper (0.02 parts by mass). The resulting mixture was kneaded, while portionwise adding 15.0 parts by mass of iced water to the mixture, for about 2 minutes using a vertical type mixer (Model:MIGHTY 60; manufactured by Aicohsha Manufacturing Co., Ltd.), during which time attention was paid to maintaining the temperature of the raw material at not higher than 10° C.

After about 2000 g of the resulting meat paste was deaerated under a reduced pressure of about 80 to 90 kPa for about 60 seconds, about 500 g each of such meat paste was filled in the natural casings (obtained in Examples 1 to 3 and Test Example 1) using a filling device, and the resulting product with linkings on about every 5 cm was moved into a smoking chamber, dried first at 60° C. under relative humidity of 30% for about 20 minutes, smoked subsequently at 60° C. under relative humidity of 30% for about 20 minutes, and finally boiled at 80° C. under relative humidity 95% for 30 minutes. Immediately after the boiling, the boiled product was cooled in running water for 10 minutes to refresh it, thereby giving a sausage (Wiener sausage). Thereafter, the obtained sausage was preserved in a refrigerator (inner temperature of 4° C.).

About 4000 g of meat paste prepared separately was deaerated under a reduced pressure of about 80 to 90 kPa for about 60 seconds, and then about 500 g each of the meat paste was stuffed into the natural intestine casings (obtained in Examples 4 to 8, and Test Examples 2 and 3) using a filling device. The subsequent processing was carried out similarly to the above-mentioned procedure, thus producing a sausage (Frankfurt sausage).

Sensory Evaluation

The sausages preserved in a refrigerator (inner temperature of 4° C.) were taken out and immersed in a water bath of about 55° C. for 20 minutes. With respect to sausages which were warmed to about 55° C., texture (crisp) and hardness of the casings were evaluated by a sensory test with 10 panelists. Evaluation criterion of each item was shown below. The results were expressed in terms of the average evaluation scores of 10 panelists. The results were shown in Tables 1 and 2.

Evaluation Criterion
(1) Texture (crispness)
   5: elastic, good
   4: a little good
   3: normal
   2: a little bad
   1: no elastic, bad
(2) Hardness
   5: after eating, no casing remained at all in the mouth
   4: after eating, almost no casing remained in the mouth
   3: after eating, casing remained slightly in the mouth
   2: after eating, casing remained a little in the mouth
   1: after eating, casing remained much in the mouth

TABLE 1

| Test Group | Casing | Texture (crispness) | Hardness |
|---|---|---|---|
| 1 | obtained in Example 1 | 3.9 | 3.7 |
| 2 | obtained in Example 2 | 3.5 | 3.5 |
| 3 | obtained in Example 3 | 3.7 | 4.0 |
| 4 | Control (obtained in Test Example 1) | 1.2 | 1.5 |

TABLE 2

| Test Group | Casing | Texture (crispness) | Hardness |
|---|---|---|---|
| 5 | obtained in Example 4 | 3.5 | 3.5 |
| 6 | obtained in Example 5 | 3.5 | 3.5 |
| 7 | obtained in Example 6 | 3.5 | 3.5 |
| 8 | obtained in Example 7 | 3.9 | 3.7 |
| 9 | obtained in Example 8 | 4.2 | 4.2 |
| 10 | Control (obtained in Test Example 2) | 1.2 | 1.5 |
| 11 | Control (obtained in Test Example 3) | 1.1 | 1.0 |

The results in Table 1 showed clearly that the sausages (Wiener sausages) produced by using the sheep casings which were treated with a solution containing a food emulsifier (Examples 1 to 3) were superior in the texture and hardness compared to those of the sausages (Wiener sausages) produced by using the sheep casings (Control) which were not treated with the solution containing a food emulsifier.

It is also apparent from the results in Table 2 that sausages (Frankfurt sausages) produced by using the pig casings which were treated with a solution containing a food emulsifier (Examples 4 to 8) were superior in the texture and hardness compared to those of sausages (Frankfurt sausages) produced by using the pig casings (Control) which were not treated with a solution containing a food emulsifier.

INDUSTRIAL APPLICABILITY

The natural intestines of the present invention can be used as a casing for sausages and the like.

What is claimed is:

1. A method for producing a modified natural intestine, which comprises immersing a natural intestine in a solution containing a food emulsifier.

2. The method according to claim 1, wherein the food emulsifier is a glycerol organic fatty acid ester, a polyglycerol fatty acid ester or an enzymatically decomposed lecithin.

3. A sausage produced by using, as a casing, the modified natural intestine which is obtained according to the method described in claim 2.

4. A sausage produced by using, as a casing, the modified natural intestine which is obtained according to the method described in claim 1.

5. The method according to claim 1, wherein the food emulsifier is a glycerol fatty acid ester, a sucrose fatty acid ester, a sorbitan fatty acid ester, a propylene glycol fatty acid ester or a lecithin.

6. A sausage produced by using, as a casing, the modified natural intestine which is obtained according to the method described in claim 5.

7. An article of manufacture comprising a modified natural intestine, which is produced by immersing a natural intestine in a solution containing a food emulsifier.

8. The article according to claim 7, wherein the food emulsifier is a glycerol organic fatty acid ester, a polyglycerol fatty acid ester or an enzymatically decomposed lecithin.

9. The article according to claim 7, wherein the food emulsifier is a glycerol fatty acid ester, a sucrose fatty acid ester, a sorbitan fatty acid ester, a propylene glycol fatty acid ester or a lecithin.

* * * * *